United States Patent [19]
Kalina et al.

[11] Patent Number: 5,822,990
[45] Date of Patent: Oct. 20, 1998

[54] CONVERTING HEAT INTO USEFUL ENERGY USING SEPARATE CLOSED LOOPS

[75] Inventors: Alexander I. Kalina, Hillsborough; Lawrence B. Rhodes, Livermore, both of Calif.

[73] Assignee: Exergy, Inc., Hayward, Calif.

[21] Appl. No.: 598,950

[22] Filed: Feb. 9, 1996

[51] Int. Cl.⁶ .................................................. F01K 25/06
[52] U.S. Cl. ......................... 60/649; 60/641.2; 60/655; 60/673
[58] Field of Search ..................... 60/641.2, 649, 60/655, 673

[56] References Cited

U.S. PATENT DOCUMENTS

| | | | |
|---|---|---|---|
| 4,346,561 | 8/1982 | Kalina | 60/673 |
| 4,489,563 | 12/1984 | Kalina | 60/673 |
| 4,548,043 | 10/1985 | Kalina | 60/673 |
| 4,586,340 | 5/1986 | Kalina | 60/673 |
| 4,604,867 | 8/1986 | Kalina | 60/653 |
| 4,732,005 | 3/1988 | Kalina | 60/673 |
| 4,763,480 | 8/1988 | Kalina | 60/649 |
| 4,899,545 | 2/1990 | Kalina | 60/673 |
| 4,982,568 | 1/1991 | Kalina | 60/649 |
| 5,029,444 | 7/1991 | Kalina | 60/673 |
| 5,095,708 | 3/1992 | Kalina | 60/673 |
| 5,440,882 | 8/1995 | Kalina | 60/641.2 |
| 5,450,821 | 9/1995 | Kalina | 60/676 |
| 5,572,871 | 11/1996 | Kalina | 60/649 |
| 5,588,298 | 12/1996 | Kalina et al. | 60/670 |

FOREIGN PATENT DOCUMENTS

| | | |
|---|---|---|
| 211181 | 12/1986 | New Zealand . |
| 212813 | 4/1987 | New Zealand . |
| 231596 | 8/1992 | New Zealand . |
| 239143 | 12/1993 | New Zealand . |
| 248146 | 4/1995 | New Zealand . |
| 247880 | 8/1995 | New Zealand . |
| 250819 | 12/1995 | New Zealand . |
| 264705 | 12/1995 | New Zealand . |

Primary Examiner—Noah P. Kamen
Attorney, Agent, or Firm—Fish & Richardson P.C.

[57] ABSTRACT

Converting heat in a primary fluid (e.g., steam) to useful energy by multistage expansion of the primary fluid, heating of a multicomponent working fluid in a separate closed loop using heat of the primary fluid, and expansion of the multicomponent working fluid. The primary fluid in a vapor state is expanded in a first stage expander to obtain useful energy and to produce a partially expanded primary fluid. The partially expanded primary fluid stream is then separated into liquid and vapor components and split into a vapor stream (which is expanded in a second stage expander) and a further primary stream (which used to heat the multicomponent working fluid).

42 Claims, 2 Drawing Sheets

CONVERTING HEAT INTO USEFUL ENERGY USING SEPARATE CLOSED LOOPS

BACKGROUND OF THE INVENTION

The invention relates to converting thermal energy (e.g., heat produced by the combustion of toxic and/or corrosive fuels such as municipal waste or heat from geofluid) into useful (e.g., mechanical and electrical) energy.

In the process of combustion of fuels which generate toxic and/or corrosive flue gases, it is necessary to maintain the temperature of the boiler's tubes below some temperature level in order to prevent rapid corrosion of these tubes. This is usually achieved by circulating boiling water through these tubes and producing, as a result, saturated or slightly superheated steam. Conventionally, this steam is then subjected to expansion in a steam turbine, in order to produce useful power. However, because this steam is usually saturated or superheated only slightly, expansion of it causes the turbine to work in the wet region, which drastically reduces efficiency and longevity of the steam turbine. Because the steam turbine cannot operate in conditions where wetness of the vapor exceeds 12–13%, it is therefore often necessary to stop the expansion in the middle of the expansion and separate and remove the liquid and thereafter continue further expansion.

Useful energy can also be obtained from geofluid containing steam and brine, as described, e.g., in U.S. Pat. No. 5,440,882.

SUMMARY OF THE INVENTION

In one aspect, the invention features, in general, converting heat in a primary fluid (e.g., steam) to useful energy by multistage expansion of the primary fluid, heating of a multicomponent working fluid in a separate closed loop using heat of the primary fluid, and expansion of the multicomponent working fluid. The primary fluid in a vapor state is expanded in a first stage expander to obtain useful energy and to produce a partially expanded primary fluid stream. The partially expanded primary fluid stream is then separated into liquid and vapor components and split into a vapor stream (which is expanded in a second stage expander) and a further primary stream (which used to heat the multicomponent working fluid).

In preferred embodiments, spent multicomponent working fluid (that has been expanded) is condensed at a condenser and passed through a recuperative heat exchanger in which heat from the spent multicomponent working fluid is used to recuperatively heat the condensed multicomponent working fluid. The primary fluid can be heated in a boiler or can be steam from a geofluid.

In another aspect, the invention features, in general, converting heat to useful energy by using two closed loops. One closed loop contains a primary working fluid that is heated by an external source of heat (e.g., in a boiler combusting corrosive or toxic fuel) and then split into two streams. The first stream is expanded to obtain useful energy (e.g., in a turbine), and the second stream is used at a first heat exchanger to heat a multicomponent working fluid in the second closed loop. The heated multicomponent working fluid is then also expanded to obtain further useful energy (e.g., in a second turbine).

In preferred embodiments the first stream is split into two streams, one of which is a vapor stream that is expanded to obtain useful energy, and both of the additional streams are used to also heat the multicomponent working fluid at two further heat exchangers.

In another aspect, the invention features, in general, a power system for converting heat in a geofluid containing steam and brine to useful energy. The steam is separated from the brine and expanded, and heat in the steam is used to heat a multicomponent working fluid in a separate closed loop at a first heat exchanger. The separated brine is used to further heat the multicomponent working fluid at a second heat exchanger, and is then discharged from the system. The multicomponent working fluid is then expanded to obtain further useful energy.

In preferred embodiments the spent multicomponent working fluid is condensed at a condenser and passed through a recuperative heat exchanger in which heat from the spent multicomponent working fluid is used to recuperatively heat the multicomponent working fluid after being condensed at the condenser. The heat used to heat the multicomponent working fluid in the first heat exchanger is obtained from steam that has been expanded and then split into two streams. One stream is a vapor that is expanded to obtain useful energy, and the other stream passes through the first heat exchanger, and is thereafter throttled and recombined with the expanded stream.

Other advantages and features of the invention will be apparent from the following description of particular embodiments thereof and from the claims.

DESCRIPTION OF PARTICULAR EMBODIMENTS OF THE INVENTION

Figure 1:
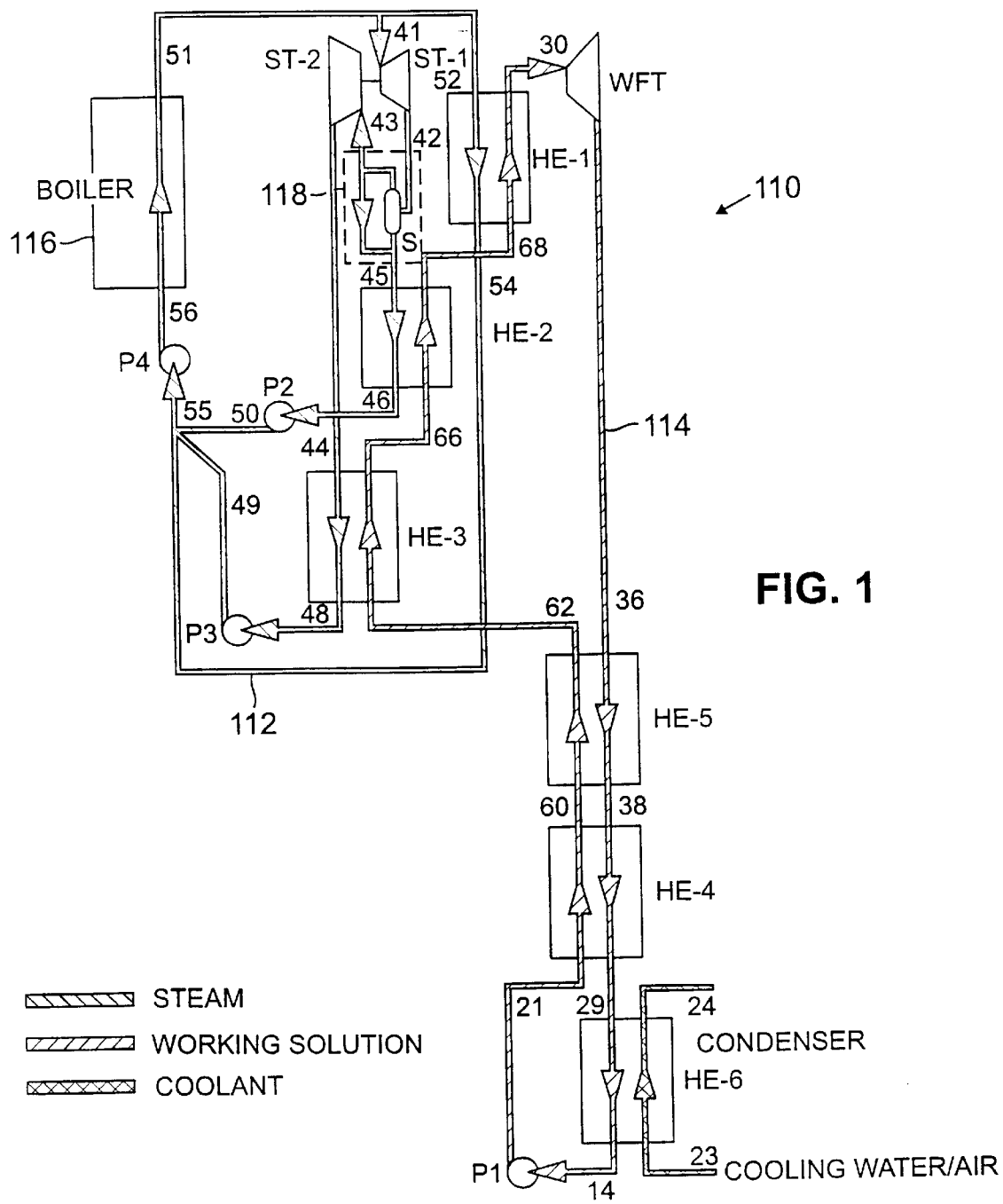
FIG. 1 is a schematic representation of one embodiment of the invention in which heat is obtained from combustion of fuel.

Referring to FIG. 1, there is shown apparatus 110 for converting heat into mechanical energy. Apparatus 110 includes first and second closed loops 112, 114. Loop 112 includes water as a primary working fluid. Loop 114 includes a water/ammonia mixture as a multicomponent working fluid. Systems with multicomponent working fluids are described in Alexander I. Kalina's U.S. Pat. Nos. 4,346,561; 4,489,563; 4,548,043; 4,586,340; 4,604,867; 4,732,005; 4,763,480; 4,899,545; 4,982,568; 5,029,444; 5,095,708; 5,440,882; 5,450,821, and applications Ser. Nos. 08/283,091, 08/546,419 which are hereby incorporated by reference.

In closed loop 112, condensed liquid water with parameters as at point 56 is sent through tubes into boiler 116, which combusts corrosive and/or toxic fuels. In the tubes in boiler 116, water boils, producing dry, saturated steam with parameters as at point 51. Steam with parameters as at point 51 is divided into first and second primary streams having parameters as at points 41 and 52, respectively. The stream of steam with parameters as at point 41 is sent into the first stage of steam turbine ST-1, which is a first expander where the steam expands to an intermediate pressure, producing power and leaving ST-1 with parameters as at point 42. This steam, already wet, is sent into separator S in separator/splitter 118, where the liquid in the expanded first primary stream is separated from the vapor. Part of the separated vapor having parameters as at point 43 makes up a third primary stream that is sent into the second stage, ST-2 (a second expander) of the steam turbine. The remainder of the steam and all of the liquid leaving separator S are combined to create a fourth primary stream with parameters as at point 45. The third primary stream of steam having parameters as at point 43 (see above) is expanded in the second stage of steam turbine ST-2, producing power and obtaining parameters as at point 44. As a result, second, third, and fourth primary streams of saturated or wet steam are created having parameters as at points 52, 44, and 45, respectively. The second primary stream with parameters as at point 52 has the highest pressure and temperature. The fourth primary stream with parameters as at point 45 has intermediate pressure and temperature, and the third primary stream with parameters as at point 44 has the lowest pressure and temperature, respectively. Steam in the second primary stream with parameters as at point 52 is sent into heat exchanger HE-1 where it is condensed and then subcooled, releasing heat and leaving HE-1 with parameters as at point 54. Steam in the fourth primary stream with parameters as at point 45 is sent into second heat exchanger HE-2 where it is condensed and subcooled, releasing heat and leaving third HE-2 with parameters as at point 46. This fourth primary stream is then pumped by pump P-2 up to a pressure equal to that of steam in the second primary stream having parameters as at point 54 (see above) and obtains parameters as at point 50. Steam in the third primary stream with parameters as at point 44 is sent into third heat exchanger HE-3 where it is condensed and subcooled, releasing heat and leaving heat exchanger HE-3 with parameters as at point 48. This third primary stream is then pumped by pump P-3 to a pressure equal to that of the second and fourth primary steams having parameters as at points 54 and 50 (see above) and obtains parameters as at point 49. Thereafter, second, third, and fourth primary streams having parameters as at points 54, 49, and 50, respectively, are combined to create a stream with parameters as at point 55. This stream is then pumped by pump P-4 to the required pressure, acquiring parameters as at point 56 (see above), and is sent into boiler 116.

In second closed loop 114, a fully-condensed multicomponent working fluid having parameters as at point 14 is pumped to the required high pressure by pump P-1 and obtains parameters as at point 21. Thereafter, a stream of multicomponent working fluid with parameters as at point 21 passes through fourth heat exchanger HE-4 where it is heated and obtains parameters as at point 60. Preferably the state of the working fluid at point 60 is a saturated liquid. Thereafter, the stream of multicomponent working fluid with parameters as at point 60 is passed through recuperative fifth heat exchanger HE-5 where it is partially vaporized, obtaining parameters as at point 62. A stream with parameters as at point 62, thereafter, is sent into third heat exchanger HE-3 (see above) where it is further heated and vaporized by heat released in third heat exchanger HE-3 and obtains parameters as at point 66. Thereafter, a stream of working fluid having parameters as at point 66 is sent into second heat exchanger HE-2 where it is further heated and fully vaporized by heat released in second heat exchanger HE-2. A stream of multicomponent working fluid leaving heat exchanger HE-2 with parameters as at point 68 (preferably in the state of saturated vapor), enters first heat exchanger HE-1 where it is superheated by heat released in heat exchanger HE-1 and leaves with parameters as at point 30. A stream of multicomponent working fluid with parameters as at point 30 passes through working fluid turbine WFT (a second expander) where it is expanded, producing power and leaving WFT as a spent multicomponent working fluid with parameters as at point 36. The spent multicomponent working fluid with parameters as at point 36 passes through recuperative heat exchanger HE-5 where it is cooled and partially condensed, releasing heat (see above) and leaves HE-5 with parameters as at point 38. Thereafter, a stream of multicomponent working fluid with parameters as at point 38 enters recuperative heat exchanger HE-4 where it is further cooled and condensed, releasing heat (see above) and leaves HE-4 with parameters as at point 29. A stream of a partially condensed multicomponent working fluid having parameters as at point 29 passes through a condenser HE-6 where it is fully condensed by a stream of cooling water or cooling air 23–24 and obtains, as a result, parameters as at point 14.

All specific parameters of all key points of the described process are presented in Table 1.

Apparatus 110 provides effective conversion of heat produced by combustion of toxic and corrosive fuels. A summary of performance of the proposed FIG. 1 system is presented in Table 2 and shows a net thermal efficiency of 28.14%. In a traditional system based on direct expansion of the steam, steam leaving the boiler with the identical parameters as at point 51 would produce a net efficiency of 21%. As a result, the FIG. 1 system increases efficiency of heat conversion and power generation by 33%.

Figure 2:
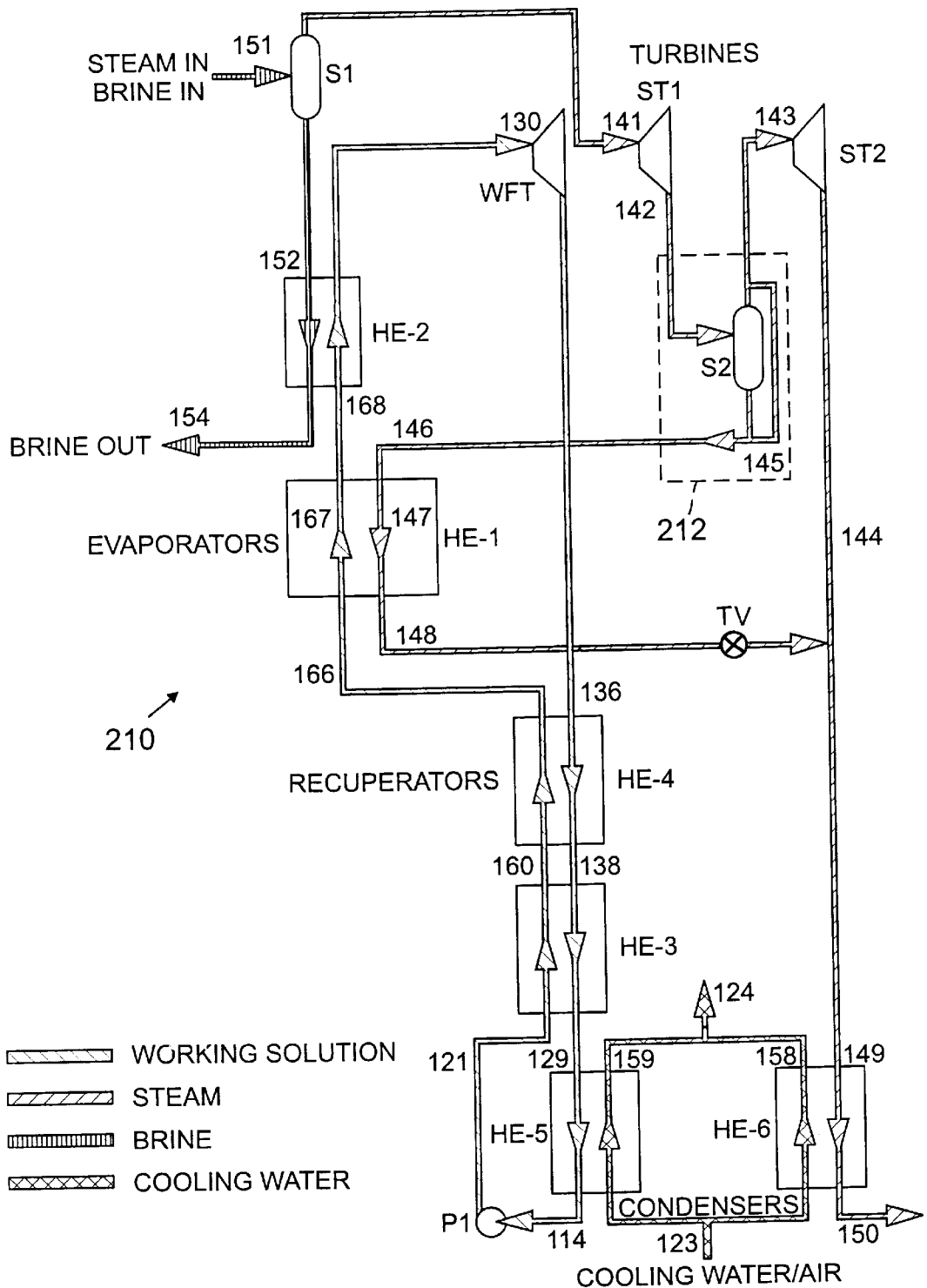
FIG. 2 is a schematic representation of a second embodiment of the invention in which heat is obtained from geofluid containing steam and brine.

Referring to FIG. 2, there is shown power system 210 designed for utilization of heat from geofluid consisting of steam and brine. The high mineralization of brine limits the extent to which it can be practically cooled and results in conditions that are similar in some respects to the FIG. 1 system designed for utilization of corrosive and toxic fuels. The similarity of conditions permits some of the same principles to be utilized in geofluid power system 210.

In geofluid power system 210, geofluid comprising steam and mineralized brine having parameters as at point 151 enters separator S-1 where it is separated into a stream of saturated steam having parameters as at point 141 and stream of mineralized liquid brine having parameters as at point 152. Stream of steam having parameters as at point 141 enters into the high pressure steam turbine ST-1, where it is expanded to intermediate pressure obtaining parameters as at point 142. Steam with parameters as at point 142 is wet and enters into separator S-2 in separator/splitter 212, where the liquid in the expanded steam is separated from the vapor and split into a first stream with parameters as at point 143 and a second stream with parameters as at point 146. Steam exiting separator S-2 is divided into two substreams with parameters as at point 143 and point 145, respectively. Thereafter, the first stream (steam with parameters as at point 143) is sent into the low pressure steam turbine ST-2 where it is expanded to a low pressure and produces useful energy. High pressure steam turbine ST-1 and low pressure steam turbine ST-2 are first and second stage expanders, respectively, for the steam. After expansion at low pressure turbine ST-2, the first stream obtains parameters as at point 144. Stream of steam with parameters as at point 145 is mixed with the liquid removed from separator S-2 and creates the second stream with parameters as at point 146. The second stream passes through first heat exchanger HE-1, where it is condensed and subcooled, exiting this heat exchanger with parameters as at point 148. Thereafter, stream of condensate with parameters as at point 148 is throttled at throttle valve TV to the pressure equal to the pressure of the stream from ST-2 having parameters as at point 144 and is mixed with this stream. As a result of such a mixing, the stream of a partially condensed steam having parameters as at point 149 is created. The stream having parameters as at point 149 passes through steam condenser HE-6, where it is cooled by cooling water or air, and fully condenses, obtaining the parameters as at point 150. The condensed stream is then discharged from system 210.

Liquid brine removed from separator S-1 and having parameters as at point 152 (see above) passes through second heat exchanger HE-2, where it is cooled and obtains parameters as at point 154. Heat released from the brine in heat exchanger HE-2 is transferred to a working fluid of the binary cycle which is described below. The cooled brine is thereafter discharged from system 210 at an acceptable temperature.

Working fluid of a binary cycle which is fully condensed and having parameters as at point 114 is pumped by pump P-1 and obtains parameters as at point 121. Thereafter, the stream of working fluid with parameters as at point 121 passes through recuperative heat exchanger HE-3, where it is heated and obtains parameters as at point 160. The state of working fluid with parameters as at point 160 preferably is saturated liquid. Thereafter, the stream with parameters as at point 160 passes through heat exchanger HE-4 where it is partially boiled and obtains parameters as at point 166. Thereafter, the stream of working fluid having parameters as at point 166 passes through first heat exchanger HE-1, where it is heated by heat from the second stream from separator/splitter 212 and is fully vaporized, leaving heat exchanger HE-1 with parameters as at point 168. Multicomponent working fluid having parameters as at point 168 passes through second heat exchanger HE-2 where it is superheated by heat released in the process of cooling liquid geothermal brine. As a result of heating in heat exchanger HE-1, working fluid obtains parameters as at point 130 with which it enters the working fluid turbine WFT. In turbine WFT, working fluid is expanded producing work and obtaining parameters as at point 136. Thereafter, spent multicomponent working fluid having parameters as at point 136 passes through recuperative heat exchanger HE-4 where it is partially condensed and leaves this heat exchanger with parameters as at point 138. Heat released in heat exchanger HE-4 is utilized for initial evaporation of the working fluid (between points 160 and 166). Thereafter, working fluid having parameters as at point 138 passes through heat exchanger HE-3 where it is further condensed obtaining parameters as at point 129. Heat released in heat exchanger HE-3 is utilized for preheating of an oncoming stream of working fluid (between points 121 and 160) as described above. Stream of working fluid having parameters as at point 129 is further sent into condenser HE-5, where it is fully condensed by cooling water or air obtaining parameters as at point 114. The cycle of the working fluid is closed.

In power system 210, heat of condensation of steam after the second stage of a turbine (ST-2) is not used for heating and vaporizing working fluid in the binary cycle (as in system 110 in FIG. 1) but rather is rejected to the ambient. This is because such heat is of a very low temperature and does not contain the potential to generate power.

Power system 210 shown on FIG. 2, being applied to the utilization of geothermal energy, provides increased efficiency of approximately 30% compared with the conventional systems in which steam is expanded fully to the lowest possible pressure, and liquid is throttled to produce additional steam which, as well, is expanded to the lowest possible pressure.

The parameters of all streams in power system 210 at all of the key points are presented in Table 3, and the summary of performance of this system is presented in Table 4.

Both described systems 110, 210 employ multi-stage expansion of steam which is used as a heat source with utilization of heat of condensation for heating and vaporizing a multicomponent working fluid in the closed binary cycle. Also, in both cases, the multicomponent working fluid in the binary cycle is a mixture of at least two components. The composition of components in the multicomponent working fluid is chosen in such a way as to provide that the initial temperature of condensation of a working fluid, after expansion, is higher than the initial temperature of boiling of the same working fluid before expansion. This, in turn, provides for recuperative initial boiling of oncoming working fluid.

Other embodiments of the invention are within the scope of the appended claims. For example, it is possible in the system presented on FIG. 1, to use as a source of heat not steam but a mixture of steam and liquid and use the heat released by cooling this liquid for superheating the working fluid of a binary cycle.

TABLE 1

| # | PpsiA | X | T °F. | H BTU/lb | G/G30 | Flow lb/hr | Phase |
|---|---|---|---|---|---|---|---|
| 14 | 115.93 | .7338 | 86 | −15.96 | 1 | 93,701 | SatLiquid |
| 21 | 534 | .7338 | 87.46 | −13.64 | 1 | 93,701 | Liq 10° |
| 29 | 116.23 | .7338 | 160.12 | 375.03 | 1 | 93,701 | Wet .4203 |
| 30 | 495 | .7338 | 590 | 974.33 | 1 | 93,701 | Vap 237° |
| 36 | 117.53 | .7338 | 354.53 | 851.83 | 1 | 93,701 | Vap 9° |
| 37 | 116.83 | .7338 | 257.18 | 796.41 | 1 | 93,701 | SatVapor |
| 38 | 116.53 | .7338 | 201.10 | 497.89 | 1 | 93,701 | Wet .3001 |
| 41 | 1529.67 | Steam | 599 | 1166.81 | .6106 | 57,213 | SatVapor |
| 42 | 664 | Steam | 497.37 | 1116.46 | .6106 | 57,213 | Wet .12 |
| 43 | 664 | Steam | 497.37 | 1202.61 | .4137 | 38,767 | SatVapor |
| 44 | 161.13 | Steam | 364.16 | 1109.19 | .4137 | 38,767 | Wet .1009 |
| 45 | 664 | Steam | 497.37 | 935.26 | .1969 | 18,446 | Wet .3724 |

TABLE 1-continued

| # | PpsiA | X | T °F. | H BTU/lb | G/G30 | Flow lb/hr | Phase |
|---|---|---|---|---|---|---|---|
| 46 | 664 | Steam | 497.37 | 484.38 | .1969 | 18,446 | SatLiquid |
| 48 | 146.13 | Steam | 277.12 | 246.23 | .4137 | 38,767 | Liq 79° |
| 49 | 1514.67 | Steam | 280.20 | 252.05 | .4137 | 38,767 | Liq 317° |
| 50 | 1514.67 | Steam | 501.26 | 488.66 | .1969 | 18,446 | Liq 96° |
| 51 | 1529.67 | Steam | 599 | 1166.81 | .7064 | 66,186 | SatVapor |
| 52 | 1529.67 | Steam | 599 | 1166.81 | .0958 | 8,973 | SatVapor |
| 54 | 1514.67 | Steam | 497.37 | 484.13 | .0958 | 8,973 | Liq 100° |
| 55 | 1514.67 | Steam | 374.55 | 349.45 | .7064 | 66,186 | Liq 223° |
| 56 | 1559.67 | Steam | 374.66 | 349.63 | .7064 | 66,186 | Liq 227° |
| 60 | 524 | .7338 | 195.70 | 109.22 | 1 | 93,701 | SatLiquid |
| 61 | 519 | .7338 | 251.78 | 407.74 | 1 | 93,701 | Wet .4732 |
| 62 | 514 | .7338 | 268.12 | 463.16 | 1 | 93,701 | Wet .4029 |
| 66 | 509 | .7338 | 355.16 | 820.19 | 1 | 93,701 | SatVapor |
| 68 | 502 | .7338 | 488.37 | 908.95 | 1 | 93,701 | Vap 134° |
| 23 | • | Air | 68 | 8.75 | 64.1617 | 6,012,004 | |
| 24 | • | Air | 93.08 | 14.84 | 64.1617 | 6,012,004 | |

TABLE 2

| Performance Summary KCS23 | | |
|---|---|---|
| Heat to Steam Boiler | 15851.00 kW | 577.22 BTU/lb |
| Heat Rejected | 10736.96 kW | 390.99 BTU/lb |
| Σ Turbine Expansion Work | 5269.74 kW | 191.90 BTU/lb |
| Gross Electrical Output | 4900.86 kW | 178.47 BTU/lb |
| Cycle Pump Power | 166.12 kW | 6.05 BTU/lb |
| Cooling Air Fans | 139.98 kW | 5.10 BTU/lb |
| Plant Net Output | 4594.76 kW | 167.32 BTU/lb |
| Gross Cycle Efficiency | 29.87% | |
| Net Thermal Efficiency | 28.99% | |
| Fimt Law Efficiency | 33.25% | |
| Second Law Efficiency | 68.22% | |
| Second Law Maximum | 48.73% | |
| Turbine Heat Rate | 11771.21 BTU/kWh | |
| Water-Ammonia Flow Rate | 93700.80 lb/hr | |

TABLE 3

| # | PpsiA | X | T° F. | H BTU/1b | G/G3O | Flow lb/hr | Phase |
|---|---|---|---|---|---|---|---|
| 14 | 130.95 | .7102 | 96.80 | -9.16 | 1 | 394,231 | SatLiquid |
| 21 | 614.50 | .7102 | 98.22 | -6.81 | 1 | 394,231 | Liq 116$_i$ |
| 29 | 131.25 | .7102 | 176.70 | 384.01 | 1 | 394,231 | Wet.4328 |
| 30 | 588.50 | .7102 | 404.60 | 858.49 | 1 | 394,231 | Vap 32$_i$ |
| 36 | 132.55 | .7102 | 262.96 | 758.47 | 1 | 394,231 | Wet .0575 |
| 38 | 131.55 | .7102 | 217.40 | 513.95 | 1 | 394,231 | Wet .3053 |
| 41 | 276.62 | Steam | 410 | 1202.84 | .8152 | 321,374 | SatVapor |
| 42 | 52.40 | Steam | 284 | 1096.43 | .8152 | 321,374 | Wet .0854 |
| 43 | 52.40 | Steam | 284 | 1175.14 | .6673 | 263,089 | SatVapor |
| 44 | 2.50 | Steam | 134.29 | 1009.19 | .6673 | 263,089 | Wet .1083 |
| 45 | 52.40 | Steam | 284 | 1175.14 | .0783 | 30,852 | SatVapor |
| 46 | 52.40 | Steam | 284 | 741.16 | .1478 | 58,285 | Wet .4707 |
| 48 | 52.40 | Steam | 262.95 | 232.04 | .1478 | 58,285 | Liq 21$_i$ |
| 49 | 2.50 | Steam | 134.29 | 868.24 | .8152 | 321,374 | Wet .2468 |
| 50 | 2.50 | Steam | 134.29 | 102.05 | .8152 | 321,374 | SatLiquid |
| 51 | • | Brine | 410 | 385.56 | 3.2336 | 1,274,773 | |
| 54 | • | Brine | 284 | 257.04 | 3.2336 | 1,274,773 | |
| 60 | 599.50 | .7102 | 212 | 123.12 | 1 | 394,231 | SatLiquid |
| 66 | 594.50 | .7102 | 257.55 | 367.64 | 1 | 394,231 | Wet .557 |
| 68 | 589.50 | .7102 | 278.60 | 442.91 | 1 | 394,231 | Wet .4559 |
| 23 | • | Water | 87.80 | 55.80 | 24.6244 | 9,707,684 | |
| 59 | • | Water | 132.85 | 100.85 | 8.7270 | 3,440,442 | |
| 58 | • | Water | 127.09 | 95.09 | 15.8974 | 6,267,242 | |
| 24 | • | Water | 129.13 | 97.13 | 24.6244 | 9,707,684 | |

TABLE 4

Performance Summary KCS21

| | | |
|---|---|---|
| Heat in | 151693.12 kW | 1312.93 BTU/lb |
| Heat rejected | 117591.11 kW | 1017.77 BTU/lb |
| Turbine enthalpy drops | 34373.80 kW | 297.51 BTU/lb |
| Turbine Work | 33514.45 kW | 290.07 BTU/lb |
| Feed pump Æ H 2.35, power | 288.77 kW | 2.50 BTU/lb |
| Feed + Coolant pump power | 632.05 kW | 5.47 BTU/lb |
| Net Work | 32882.40 kW | 284.60 BTU/lb |
| Gross Output | 33514.45 kWe | |
| Cycle Output | 33225.68 kWe | |
| Net Output | 32882.40 kWe | |
| Net thermal efficiency | 21.68% | |
| Second law limit | 30.80% | |
| Second law efficiency | 70.37% | |
| Specific Brine Consumption | 38.77 lb/kW hr | |
| Specific Power Output | 25.79 Watt hr/lb | |

What is claimed is:

1. A method of converting heat to useful energy comprising expanding a primary fluid in a vapor state in a first stage expander to obtain useful energy and to produce a partially expanded primary fluid stream having vapor and liquid components, separating said partially expanded primary fluid stream into liquid and vapor components and splitting said stream into a vapor stream and a further primary stream including liquid, expanding said vapor stream in a second stage expander to obtain useful energy, using heat in said partially expanded primary fluid stream to heat a multicomponent working fluid in a separate closed loop at a primary heat exchanger, and expanding said multicomponent working fluid in a further expander in said separate closed loop to obtain useful energy and produce a spent multicomponent working fluid.

2. The method of claim 1 wherein said spent multicomponent working fluid is condensed at a condenser and passed through a recuperative heat exchanger in which heat from said spent multicomponent working fluid is used to recuperatively heat said multicomponent working fluid after being condensed at said condenser.

3. The method of claim 1 wherein said primary fluid in a vapor state is steam.

4. The method of claim 3 wherein said steam is generated by heating said primary fluid in a primary closed loop in a boiler.

5. The method of claim 4 wherein said heating includes burning corrosive or toxic fuels.

6. The method of claim 5 wherein said primary fluid in a vapor state is split into a first primary stream that is expanded at said first stage expander and a second primary stream that is used to further heat said multicomponent working fluid before it is expanded.

7. The method of claim 6 wherein said further primary stream is used to heat said multicomponent working fluid before it is heated at said primary heat exchanger.

8. The method of claim 3 wherein said primary fluid in a vapor state is obtained from a geofluid.

9. The method of claim 8 further comprising separating said steam from brine in said geofluid, and using said brine to further heat said multicomponent working fluid before it is expanded.

10. Apparatus for converting heat to useful energy comprising a first stage expander in which a primary fluid in a vapor state is expanded to obtain useful energy and to produce a partially expanded primary fluid stream having vapor and liquid components, a separator/splitter that separates said partially expanded primary fluid stream from said first stage expander into liquid and vapor components and splits said stream into a vapor stream and a further primary stream including liquid, a second stage expander in which said vapor stream from said separator/splitter is expanded to obtain useful energy, a primary heat exchanger connected to use heat in said partially expanded primary fluid stream to heat a multicomponent working fluid, and a separate closed loop containing said multicomponent working fluid, said second closed loop including flow passages in said primary heat exchanger, said second closed loop including a further expander in which said multicomponent working fluid is expanded to obtain useful energy and produce a spent multicomponent working fluid.

11. The apparatus of claim 10 wherein said separate closed loop includes a condenser at which said spent multicomponent working fluid is condensed and a recuperative heat exchanger in which heat from said spent multicomponent working fluid is used to recuperatively heat said multicomponent working fluid after being condensed at said condenser.

12. The apparatus of claim 10 wherein said primary fluid in a vapor state is steam.

13. The apparatus of claim 12 further comprising a boiler that generates said steam by heating said primary working fluid.

14. The apparatus of claim 13 wherein said boiler is a boiler that includes means for burning corrosive or toxic fuels.

15. The apparatus of claim 14 further comprising a stream splitter at which said primary fluid in a vapor state is split into a first primary stream that is expanded at said first stage expander and a second primary stream that is used to further heat said multicomponent working fluid before it is expanded.

16. The apparatus of claim 15 wherein said further primary stream is connected to heat said multicomponent working fluid before it is heated at said primary heat exchanger.

17. The apparatus of claim 12 further comprising a source of geofluid and wherein said primary fluid in a vapor state is obtained from said geofluid.

18. The apparatus of claim 17 further comprising a separator at which said steam is separated from brine in said geofluid, and a further heat exchanger in which heat from said brine is used to further heat said multicomponent working fluid before it is expanded.

19. A method of converting heat to useful energy comprising heating a primary working fluid in a first closed loop with an external source of heat, splitting said heated primary working fluid into a first primary stream and a second primary stream, expanding said first primary stream in a first expander to obtain useful energy, using heat in said second primary stream to heat a multicomponent working fluid in a second closed loop at a first heat exchanger, and expanding said multicomponent working fluid in a second expander to obtain useful energy.

20. The method of claim 19 wherein said heating includes combusting corrosive or toxic fuels.

21. The method of claim 20 wherein said primary working fluid is steam.

22. The method of claim 19 wherein heat in said first primary stream is used to heat said multicomponent working fluid in a second heat exchanger after expansion in said first expander.

23. The method of claim 22 wherein said first primary stream is separated into liquid and vapor components and is split into third and fourth primary streams after expansion in said first expander, said third primary stream being a vapor that is expanded in a third expander to obtain useful energy, said fourth primary stream passing through said second heat exchanger.

24. The method of claim 23 wherein heat in said third primary stream is used to heat said multicomponent working fluid in a third heat exchanger after expansion in said third expander.

25. The method of claim 24 wherein said second, third, and fourth primary streams are combined to provide said primary working fluid that is heated by said heater.

26. The method of claim 25 wherein said first primary stream is separated into liquid and vapor phases at a separator after expansion in said first expander, part of said vapor phase providing said third primary stream and part of said vapor phase being joined with said liquid phase to provide said fourth primary stream.

27. The method of claim 19 wherein said multicomponent working fluid is condensed at a condenser, after expansion at said second expander, and passed through a fourth heat exchanger in which heat from said multicomponent working fluid prior to condensing is used to recuperatively heat said multicomponent working fluid after being condensed at said condenser.

28. Apparatus for converting heat to useful energy comprising
 a first closed loop containing a primary working fluid and including a heater for heating said primary working fluid, and a first stream splitter that splits said heated primary working fluid into a first primary stream and a second primary stream, said first closed loop also including a first expander in which said first primary stream is expanded to obtain useful energy, said first closed loop also including a flow passage through a first heat exchanger to transfer heat from said second primary stream to a multicomponent working fluid, and
 a second closed loop containing said multicomponent working fluid, said second closed loop including a flow passage through said first heat exchanger, said second closed loop including a second expander in which said multicomponent working fluid is expanded to obtain useful energy.

29. The apparatus of claim 28 wherein said heater is a boiler that includes means for combusting corrosive or toxic fuels.

30. The apparatus of claim 28 wherein said primary working fluid is steam.

31. The apparatus of claim 28 wherein said first closed loop and said second closed loop include passages in a second heat exchanger in which heat from said first primary stream is used to heat said multicomponent working fluid.

32. The apparatus of claim 31 wherein said first closed loop includes a separator/splitter that separates said first primary stream into liquid and vapor phases and splits said first primary stream into third and fourth primary streams after expansion in said first expander, said third primary stream being a vapor, said first closed loop also including a third expander thorough which said third primary stream passes and in which said third primary stream is expanded, said fourth primary stream passing thorough said second heat exchanger.

33. The apparatus of claim 32 wherein said first closed loop and said second closed loop include passages in a third heat exchanger in which heat from said third primary stream is used to heat said multicomponent working fluid.

34. The apparatus of claim 33 wherein said first closed loop includes a stream combiner at which said second, third, and fourth primary streams are combined to provide said primary working fluid that is heated by said heater.

35. The apparatus of claim 32 wherein said separator/splitter includes a separator that separates said first primary stream into liquid and vapor phases and a second stream splitter at which said vapor phase is split into said third primary stream and a further stream, and wherein said separator/splitter further comprises a stream combiner that combines said further stream and said liquid phase into said fourth primary stream.

36. The apparatus of claim 28 wherein said second closed loop includes a condenser in which said multicomponent working fluid is condensed and a fourth heat exchanger in which heat from said multicomponent working fluid prior to condensing is used to recuperatively heat said multicomponent working fluid after being condensed at said condenser.

37. A method of converting heat in a geofluid containing steam and brine to useful energy in a power system comprising
 separating said steam from said brine in said geofluid,
 expanding said steam in a first expander producing a stream of expanded steam,
 using heat in said steam to heat a multicomponent working fluid in a separate closed loop at a first heat exchanger,
 using said brine to further heat said multicomponent working fluid from said first heat exchanger at a second heat exchanger,
 discharging said brine from said second heat exchanger from the system, and
 expanding said multicomponent working fluid in a second expander in said separate closed loop to obtain useful energy and produce a spent multicomponent working fluid, wherein said spent multicomponent working fluid is condensed at a condenser and passed through a recuperative heat exchanger in which heat from said spent multicomponent working fluid is used to recuperatively heat said multicomponent working fluid after being condensed at said condenser, wherein said heat used to heat said multicomponent working fluid in said first heat exchanger is obtained from steam that has been expanded in said first expander, wherein said stream of expanded steam is separated into liquid and vapor components and is split into first and second streams after expansion in said first expander, said first stream being a vapor that is expanded in a third expander to obtain useful energy, said second stream passing through said first heat exchanger.

38. The method of claim 37 wherein said second stream is throttled after passing through said first heat exchanger and combined with said first stream after said first stream has been expanded in said third expander.

39. The method of claim 38 wherein the combined first and second streams are condensed and discharged from the system.

40. Apparatus for converting heat in a geofluid containing steam and brine to useful energy in a power system comprising a separator that separates said steam from said brine in said geofluid, a first expander that expands said steam to obtain useful energy and produces a stream of expanded steam, a separate closed loop containing a multicomponent working fluid, said second closed loop including flow passages in a first heat exchanger in which heat in said steam is used to heat said multicomponent working fluid, said second closed loop including flow passages in a second heat exchanger in which said brine further heats said multicomponent working fluid from said first heat exchanger, said second closed loon including a second expander in which said multicomponent working fluid from said second heat exchanger is expanded to obtain useful energy and produce a spent multicomponent working fluid, and an outflow line connected to discharge said brine from said second heat exchanger from the system, wherein said separate closed loop includes a condenser in which said spent multicomponent working fluid is condensed and a recuperative heat exchanger in which heat from said spent multicomponent working fluid is used to recuperatively heat said multicomponent working fluid after being condensed at said condenser, wherein said heat used to heat said multicomponent working fluid in said first heat exchanger is obtained from steam that has been expanded in said first expander, further comprising a separator/splitter that separates said stream of expanded steam into liquid and vapor components and splits said stream of expanded steam into first and second streams, said first stream being a vapor, and further comprising a third expander through which said first stream passes and in which said first stream is expanded to obtain useful energy, said second stream passing through said first heat exchanger.

41. The apparatus of claim 40 further comprising a throttle valve in which said second stream is throttled after passing through said first heat exchanger and a junction at which said second stream from said throttle valve is combined with said first stream after said first stream has been expanded in said third expander.

42. The apparatus of claim 41 wherein the combined first and second streams are condensed and discharged from the system.

* * * * *